Aug. 15, 1961     J. D. PATTON     2,995,933
DEVICE FOR MEASURING THE FLOW OF LIQUIDS
Filed Dec. 23, 1959
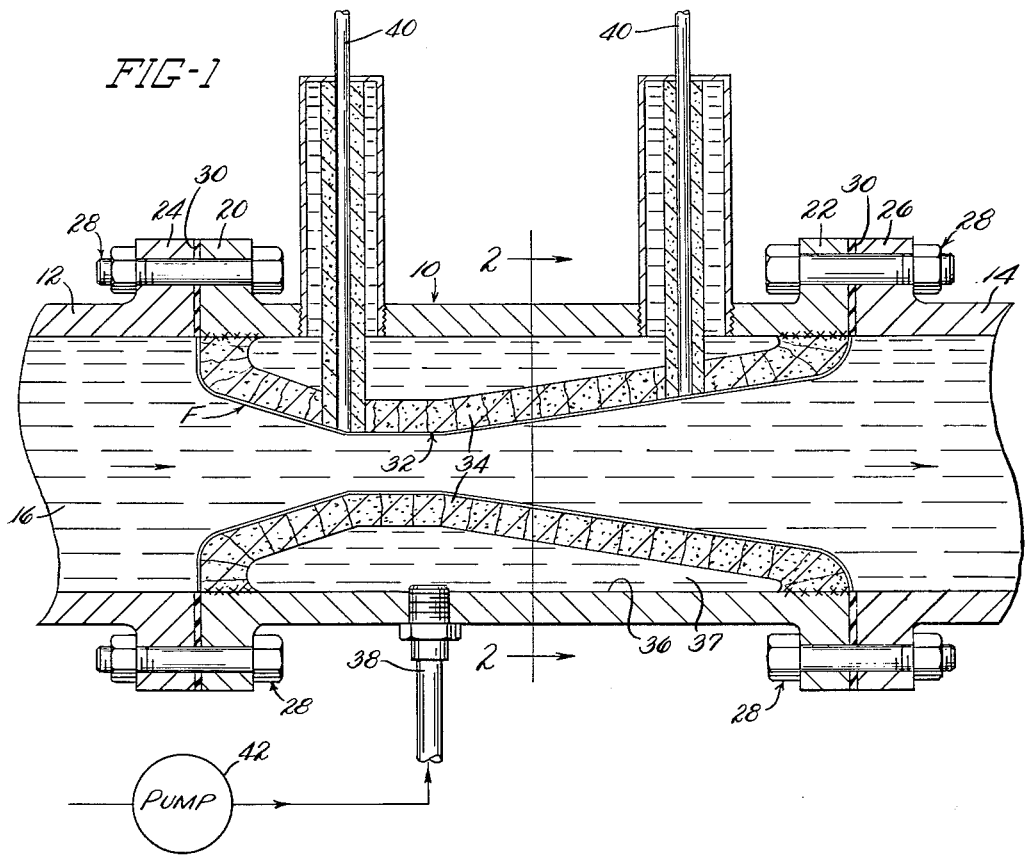
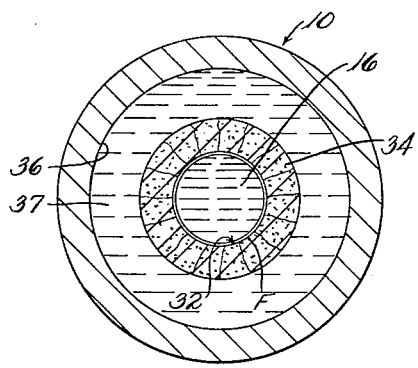

United States Patent Office 2,995,933
Patented Aug. 15, 1961

2,995,933
DEVICE FOR MEASURING THE FLOW OF LIQUIDS
John D. Patton, Akron, Ohio, assignor to The Firestone Tire & Rubber Company, Akron, Ohio, a corporation of Ohio
Filed Dec. 23, 1959, Ser. No. 861,695
2 Claims. (Cl. 73—213)

This invention relates to a device for measuring or metering the flow of liquids through conduits, and more particularly to a device for metering the flow of liquids, such as rubber latex, having low viscosity and coagulative tendencies.

Heretofore, various forms of metering devices have proved unsatisfactory for measuring the flow of liquid latex through conduits due to the coagulation of the latex at corners, edges or other friction points within the metering devices, restricting the flow of the latex and therefore registering inaccurate readings and requiring frequent maintenance.

This invention overcomes these and other difficulties by providing a novel flow meter having a lubricated throat which measures the flow of liquids efficiently and accurately.

It is therefore an object of this invention to provide a self-cleaning liquid flow meter that requires a minimum of maintenance.

Another object is to provide a liquid flow meter having means to prevent coagulation of the liquid flowing through the meter.

Another object is to provide a liquid flow meter utilizing a film or coating of compatible liquid on the inner surfaces of the meter to prevent coagulation of the liquid being metered.

Yet another object is to provide a liquid flow meter utilizing a constantly changing, compatible, liquid film or coating, weeping or oozing through the walls of the flow meter to prevent the formation of coagulum of the liquid being metered.

These and other objects will become more apparent after reference to the following specification and drawing in which:

FIGURE 1 is a longitudinal sectional view through the flow meter of the invention.

FIGURE 2 is a sectional view taken on line 2—2 of FIGURE 1.

Referring to the drawing, a liquid flow meter generally indicated at 10 is shown mounted between an inlet conduit 12 and outlet conduit 14 through which a liquid 16, such as rubber latex, flows. The body 18 of meter 10 is provided with mounting flanges 20 and 22, secured to conduit flanges 24 and 26 respectively by bolts and nuts 28. Sealing gasket 30 is mounted between the co-operating flanges. Contained within body 18 of meter 10 and secured at its ends thereto, as by welding, is the meter throat portion 32 constructed of a porous, liquid-permeable metal.

Extending radially outwardly from wall 34 and through body 18 are a pair of tubular members 40 providing passages for the liquid being metered to any conventional indicator means.

Between the wall 34 of throat portion 32 and the inner surface of body 18, is a chamber 36 for receiving liquid 37 under pressure through conduit 38 from any suitable pressure control means such as pump 42. The liquid 37 preferably is compatible or soluble with the liquid being metered. For example, when rubber latex is being metered a compatible liquid such as water and detergents, glycerin, etc. may be used.

In operation, a liquid 16 is fed through conduit 12, meter 10 and conduit 14. Compatible liquid 37 is maintained under pressure in chamber 36 to cause the liquid to continuously ooze or weep through the wall 34 and form a coating or film, F, on the inner surface of wall 34. As the liquid 37 is compatible with the metered liquid, the film is carried away by the flow of that liquid and a new film immediately forms on the metering throat 32 of the meter 10. It can be seen that with constant renewing of the film surface on the throat of the meter, the metered liquid does not have the opportunity to coagulate within the meter. The meter therefore is clean and unobstructed at all times.

From the foregoing it is apparent that the device of the invention requires a minimum of maintenance and is a meter that will maintain efficient, accurate readings at all times.

While one form of the invention has been shown and described, it is apparent that various modifications may occur to those skilled in the art without departing from the spirit and scope of the invention.

What is claimed is:

1. A meter for measuring the flow of liquid through a conduit comprising, a body portion adapted to fit between sections of said conduit, walls of porous material forming a metering throat aligned with said conduit within said body portion, a chamber defined by said walls and said body portion, and means to provide pressure upon a liquid within said chamber to urge said liquid through said walls to form a film on said throat thereby preventing said measured liquid from adhering to said throat.

2. A meter for measuring the flow of liquid through a conduit comprising, a body portion adapted to fit between sections of said conduit, walls of porous metal forming a metering throat aligned with said conduit within said body portion, a chamber defined by said walls and said body portion, and means to provide pressure upon a liquid within said chamber to urge said liquid through said walls to form a film on said throat thereby preventing said measured liquid from adhering to said throat.

References Cited in the file of this patent
FOREIGN PATENTS
194,921    Great Britain _____ Mar. 22, 1923